United States Patent [19]

Hickman et al.

[11] Patent Number: 4,581,971
[45] Date of Patent: Apr. 15, 1986

[54] AUTOMATIC ROLL AND BREAD TOP SLICER

[75] Inventors: Lloyd S. Hickman, Malden, Mass.; Andrew G. Quinzani, Epping, N.H.

[73] Assignee: Spartacus Bakery Equipment, Inc., Boston, Mass.

[21] Appl. No.: 688,059

[22] Filed: Dec. 31, 1984

[51] Int. Cl.4 ............................................. B26D 3/08
[52] U.S. Cl. ........................................ 83/884; 83/294; 83/308; 83/319; 83/887
[58] Field of Search ................. 83/884, 883, 881, 879, 83/887, 294, 318, 319

[56] References Cited

U.S. PATENT DOCUMENTS

| | | | |
|---|---|---|---|
| 3,269,237 | 8/1966 | Van Elten | 83/319 X |
| 3,377,900 | 4/1968 | Baker | 83/319 X |
| 3,797,339 | 3/1974 | Pope et al. | 83/318 X |
| 4,444,077 | 4/1984 | Wise et al. | 83/294 X |

*Primary Examiner*—Frank T. Yost
*Attorney, Agent, or Firm*—John P. McGonagle

[57] ABSTRACT

An automatic roll and bread top slicer for forming vertical slits to a predetermined depth along the top, longitudinal axis of various-sized rolls and bread loaves preliminary to baking. It includes tracks, shuttle, and shuttle drive which move across the rolls and bread loaves. Mounted on the shuttle are cutters which simultaneously slit four rolls or bread loaves. The slicer operates automatically on the rolls or bread loaves while they are in trays moving to the oven for baking.

9 Claims, 4 Drawing Figures

AUTOMATIC ROLL AND BREAD TOP SLICER

BACKGROUND OF THE INVENTION

This invention relates to bakery product slicers and particularly to automatic roll and bread top slicers.

Rolls and breads are made from flour, yeast, water, and various other ingredients. Prior to baking, the ingredients are mixed together forming dough. Within certain temperature ranges, the interaction of yeast and other ingredients causes gas to form. This in turn causes the dough to expand. When the dough is placed in the oven, the outer surface cooks first and the inner portions last. The yeast activity about the surface of the dough stops as a crust forms about the dough, however the yeast activity in the inner core of the dough does not cease until the dough is completely baked. During the period between crust formation and baking completion, gas forms as a result of the yeast activity within the dough. Due to the crust formation about the outer surface of the dough, the gas cannot escape from the dough. As baking progresses, the gas is heated causing expansion pressure within the dough against the dough's outer crust. Without an outlet, the gas eventually expands to a point where it bursts through the dough crust, thereby ruining the roll or bread loaf. To eliminate uncontrolled crust bursting in French and Italian style rolls and breads, it is customary, preliminary to baking, to slit the rolls and breads along the top longitudinal axis while the rolls and breads are still in the dough stage. This not only provides a decorative marking on the roll or bread loaf, but also provides a controlled line through which gas may escape during the baking process. A secondary purpose for slitting prior to baking would be the desire to add to a bread loaf an ingredient such as butter just prior to baking.

Heretofore, slitting the dough just prior to baking has been done manually. Bakers stand at ovens and, while conveyor trays containing pieces of dough are moving toward the ovens, the bakers slit the tops of the dough with hand-held knives. Some major drawbacks to this procedure are the lack of uniformity in the slits, the fatigue caused the bakers, and the expense of having bakers do such tasks.

The prior art includes various patents pertaining to bakery product slicers, but none of the patents, with one exception, are particularly suited for slitting the tops of various sized rolls and bread loaves. U.S. Pat. No. 2,669,269 to A. S. Schmidt discloses a rotary disk slicer for slicing rows and buns. Slicer blades are set at a predetermined elevation with the slicer blades cutting along a horizontal plane. Margin guides determine the depth of the cut in the rolls or buns as they are conveyed past the cutting blades. U.S. Pat. No. 2,987,089 to D. S. Lecroue discloses a roll slicing machine. Slicer knives are set at a predetermined elevation with the slicer knives cutting along a horizontal plane. The position of the rolls is varied independent of the slicer knives to accommodate rolls of different heights. U.S. Pat. No. 3,995,513 to D. L. White discloses a bakery product slicer and method for forming vertical slits along proof lines between adjacent buns in clusters of buns. The vertical slicing blade, set at a predetermined height, is positioned on the nominal proof line to be sliced. Means for shifting the buns sufficiently to move the proof line into alignment with the vertical blade is disclosed. The buns themselves are cut with rotary slicing blades in a horizontal plane.

U.S. Pat. No. 3,730,032 to E. L. Marckx and H. F. Stines discloses an apparatus for splitting the upper surfaces of bakery products preliminary to baking them. The apparatus is mounted directly on the oven, in front of the oven door. It includes a track, a carriage, and a carriage drive for moving the carriage across the bakery products. Mounted on the carriage are cutters, a spray, and a seeder arranged respectively, for splitting, spraying, and seeding the upper surfaces of the bakery products. The spacing between the cutters is predetermined to center them exactly on the loaves of bread or other baker's products immediately below.

SUMMARY OF THE INVENTION

The present invention is an automatic roll and bread top slicer for forming vertical slits to a predetermined depth along the top length of various sized, generally oblong rolls or bread loaves preliminary to baking. It is adapted to be superimposed over traveling conveyor trays of the type commonly found in bakeries. The trays contain a number of roll or bread loaf sections of dough. Each tray, depending on the type of roll or bread, contains up to twenty-four sections of dough. The invention includes tracks for moving the slicer, a shuttle, and shuttle drive for moving the shuttle across the sections of dough. Mounted on the shuttle are cutters which simultaneously slit a plurality of dough sections. The slicer operates automatically while the dough sections are in trays moving to the oven for baking.

DETAILED DESCRIPTION OF THE INVENTION

Figure 1:
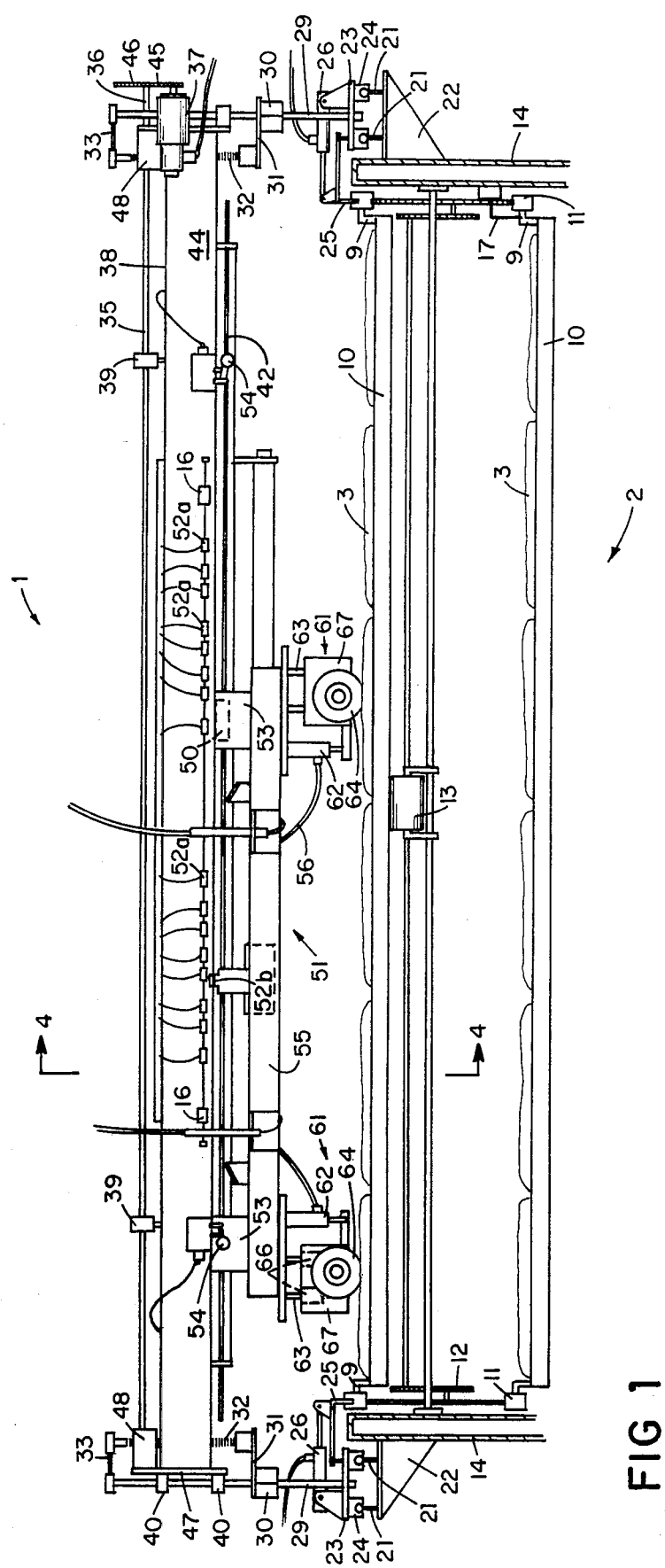
FIG. 1 is a view in front elevation of the invention in working position over a traveling conveyor tray apparatus.

Referring more particularly to the drawings wherein like numerals indicate like elements, reference numeral 1 refers generally to the automatic roll and bread top slicer comprising the present invention. Reference numeral 2 refers generally to the traveling conveyor tray apparatus which is generally called a "proofer". The proofer 2 consists of long, narrow, moving trays 10, longitudinally positioned in a horizontal plane, perpendicular to the direction of the conveyor tray 10 movement in that plane. The sections of dough 3, which correspond to rolls and bread loaves, have generally oblong shapes, and are positioned longitudinally in the trays 10. Each end 9 of a tray 10 is connected to one of the proofer's 2 two drive chains 11. The chains 11 are located on either side of the proofer 2.

The slicer 1 is positioned over the proofer 2 on hardened steel rails 21 mounted on platforms 22 attached to the sides 14 of the proofer 2. The slicer 1 rests on bases 23 positioned on each side of the proofer 2. The slicer bases 23 slideably engage the rails 21 by mans of linear bearings 24 attached to the under surfaces of the slicer bases 23.

The proofer trays 10 move through the slicing operations area in a horizontal plane in a direction perpendicular to the longitudinal axis of the trays 10. The slicer 1 is designed to move in a plane parallel to the proofer trays 10 bidirectionally in the same and opposite directions as the proofer tray 10 movement. The slicer 10 moves in the same direction as the moving proofer trays 10 by means of latching gears 25 which are hinged inward on the proofer side of the slicer bases 23. The latching gears 25 are positioned to engage the proofer drive chains 11 under control of air pistons 26 mounted on the slicer bases 23 on the sides opposite to the latching gear hinges 27. The slicer 1 then moves in the same direction and at the same speed as the proofer trays 10. As the proofer trays 10 exit the slicing operations area, they encounter a synchronization switch 17. As each tray 10 passes by the switch 17, it activates the switch 17 causing the latching gears 25 to engage the proofer drive chains 11 if they have not already done so. As the slicer 1 moves forward in synchrony with the proofer trays 10, a sensor switch 16 is encountered elsewhere (described below) which causes the latching gears 25 to disengage and base air pistons 28 to activate and pull the slicer bases 23, and thereby the slicer 1, back to their original starting position. The base air pistons 28 are fastened to the platform 22 attached to the sides of the proofer 2. The original starting position is signaled by the slicer bases' 23 linear bearings 24 activating the base switches 19 on the platform 22 as the base air pistons 28 pull the slicer bases 23 back. Activating the base switch 19 causes the process to repeat itself automatically. The slicer 1 moves forward for two trays 10, returns to its base position, and moves ahead again with a third tray 10. It has, in effect, a two tray cycle. Mounted at the forward end of the steel rails 21 is an emergency shutdown switch 18. If the synchronization switch 17, sensor switch 16, and base switch 19 are not properly coordinated, and the emergency shutdown switch 18 is encountered by the slicer bases 23 before being pulled back by the base air pistons 28, the slicer and proofer tray systems will shut down for timing adjustment.

Each slicer base 23 has mounted on and connected to it two vertical support members 29, generally made of hardened steel. attached to and connecting each of the paired vertical support members 29 on an individual slider base 23 is a rectangular block 30. Mounted on the uppermost surface of each block 30 is a horizontal platform 31 extending outward on the proofer side. Mounted on the top surface of each of the platforms 31 is a vertical stationary worm 32. The uppermost portion of each worm 32 is held in place by a locking collar 33 fastened to a vertical support member 29. Geared with the thread of each worm 32 is a worm wheel 34. A horizontal shaft 35 is journaled to each of the worm wheels 34, thereby coupling to each the action of the other. One of the worm wheels 34 is further connected by means of a camshaft 36, cam 46, and a drive chain 45 to a motor 37. The motor 37 is operated by a baker and acts on the worm wheels 34 to vertically raise or lower the horizontal shaft 35. In this embodiment of the invention, the height of the horizontal shaft 35 can be varied up to four inches, and is preset by a baker according to the type of roll or bread dough to be cut.

The horizontal shaft 35 and the vertical support members 29 form, at right angles to each other, the outer frame of the slicer 1. Secured to the horizontal shaft 36 by means of mounting bearings 39 is a crossbeam 38 with a trident-shaped cross-section having a middle member 41 and two outer members 44 and 49. The crossbeam 38 terminates at each end in vertical plates 47 slideably connected to each vertical support member 29 by means of linear bearings 49. Housings 48 for the worm wheels 34 are also attached to the crossbeam plates 47.

Figure 4:
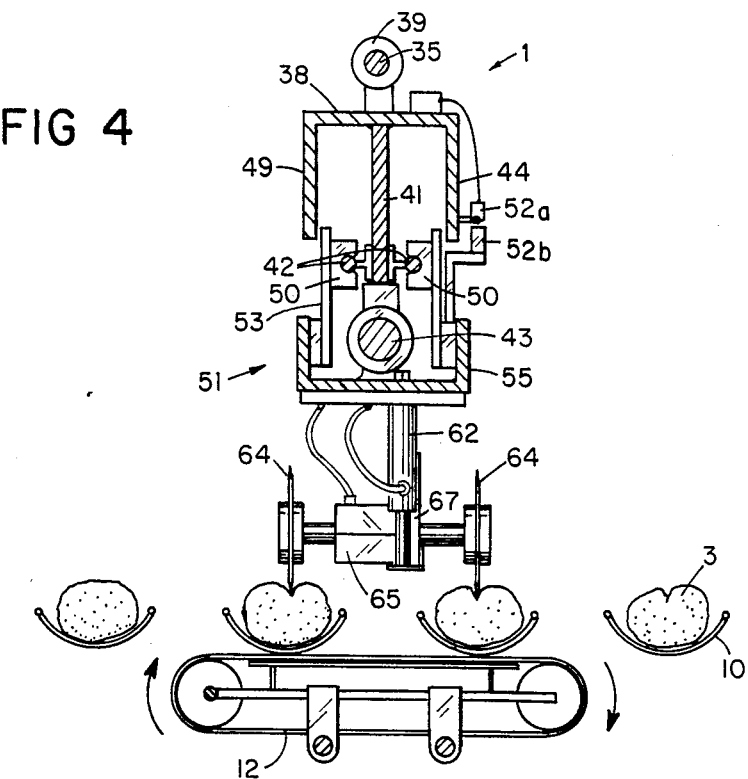
FIG. 4 is a cross-sectioned view along the plane 4—4 of the invention of FIG. 1.
Figure 2:
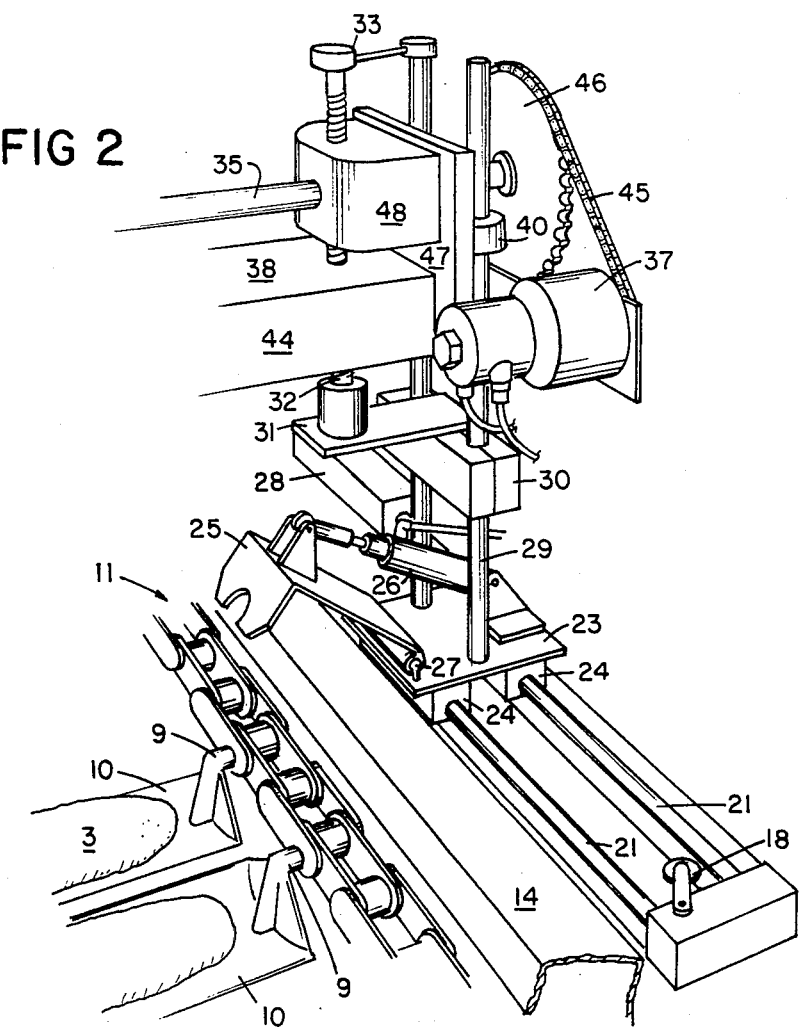
FIG. 2 is a perspective view of the front right corner of the invention.
Figure 3:
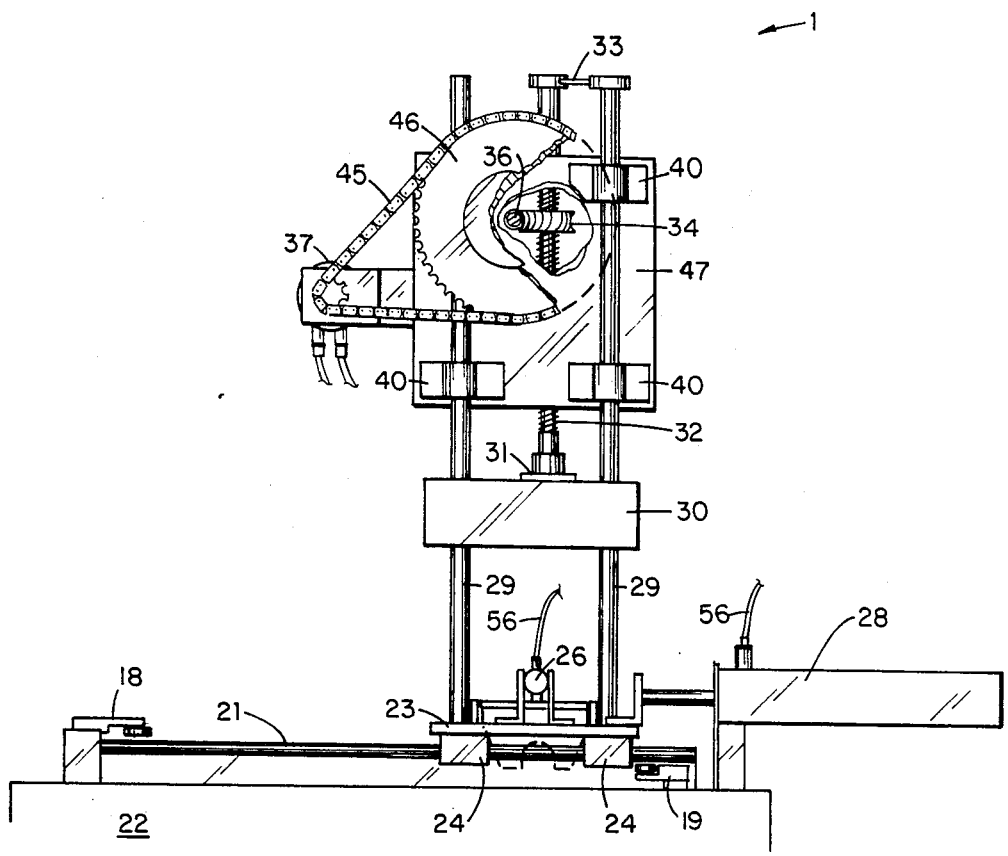
FIG. 3 is a view in side elevation of the invention of FIG. 1.

As can best be seen in FIG. 4, the hardened steel rails 42, running the length of the crossbeam 38, are mounted on each side of the crossbeam's middle member 41. Attached to the bottom of the crossbeam's middle member 41 is a linear drive cylinder 43. Suspended from the rails 42 on slideable linear bearings 50 by means of bearing plates 53, and joined to the linear drive cyclinder 43, is the shuttle 51, a linear, U-shaped section 55 of metal. The linear drive cyclinder 43 is of the rodless type featuring magnetic coupling of the piston to the yoke. The linear drive cyclinder 43 drives the shuttle 51 back and forth on the crossbeam rails 42.

Mounted on the under surfaces of the shuttle 51 are two blade assemblies 6. Each blade assembly 61 contains a vertical air piston 62, two vertical guide pins 63, two serogated, rotary, slicing blades 64, a motor 65, and a mounting plate 67. The motor 65 is mounted on the plate 67 which in turn is slideably connected by means of linear bearings 66 to the guide pins 63. The motor 65 powers the slicing blades 64 which are directly connected to it. The vertical air piston 62 interconnects the mounting plate 67 to the shuttle 51. The piston 62 raises and lowers the plate 67 and thereby the slicing blades 64 through a range of one inch. The blades 64 are so positioned that, when in the down position, each are over the middle of adjacent proofer trays 10. The up and down positions of the slicer blades 64 are controlled by magnetic switches 52, one part 52a positioned and attached to the crossbeam's front, outer member 44, and the second part 52b attached to the front of the shuttle 51.

In this embodiment of the invention, the proofer trays 10 are approximately twelve feet long. The trays 10 sag in the middle up to one-half inch. To prevent this, an auxiliary conveyor belt 12 and support 13 are arranged under the middle of the trays 10 as an auxiliary support.

OPERATION

In this embodiment of the invention, the overall height of the slicer 1 is preset by means of the baker-operated, motor-driven worm wheels 34. The height, depending upon the type of roll or bread to be sliced, can be varied by as much as four inches. When the slicer height is preset and the slicer 1 is then turned on, the latching gears 25 engage the proofer drive chains 11 as soon as one of the proofer trays 10 activates the synchronization switch 17. As the slicer 1 moves forward in synchrony with the proofer trays 10, the linear drive cylinder 43 moves the shuttle 51 from right to left. As the shuttle 51 passes a preselected switch 52a, the slicing blades 64 are vertically lowered one inch, thereby slitting the tops of the sections of dough 3 beneath them in the proofer trays 10. As the shuttle 51 progresses further, it encounters another preselected switch 52a, and the blades 64 are raised. The blades 64 are alternatively lowered and raised while the shuttle 51 passes from right to left. During this passage, the four blades 64 slit the tops of up to forty-eight sections of dough 3 in two adjacent trays 10. As the shuttle 51 moves from right to left, switch 52b encounters a sensor switch 16 which signals the shuttle 51 to stop. It also signals the latching gears 25 to disengage. Should the sensor switch 16 somehow malfunction as the shuttle 51 moves from right to left, the bearing plate 53 eventually encounters and activates a brake switch 54 which brings the shuttle 51 to a stop. At the same time, the sensor switch 16 disengages the latching gears 25 and activates the base piston 28 which pulls the slicer 1 back to its start position. One of the proofer trays 10 then hits the synchronization switch 17 engaging once more the latching gears 25 with the proofer drive chains 11. As the slicer 1 begins to move forward again, the shuttle 1 begins to move, but this time from left to right. Once again, the slicing blades 64 are lowered and raised as various preset switches 52a are encountered. The entire slitting operation, done as the shuttle 51 moved from right to left, is repeated in reverse with the shuttle 51 moving from left to right. Once again, the shuttle 51 eventually enounters a sensor switch 16 at the end of its passage, signaling the latching gears 25 to disengage and the base piston 28 to active pulling the slicer 1 back to its original start position. The entire cycle is repeated again and again, automatically, until all the dough is slit.

The switches 52a are preset by means of a standard process controller. Process controllers are common in the art and need not be discussed here. The process controller, in conjunction with the switches 17, 18, 52, and 54, also control the pneumatics in this embodiment of the invention in the proper sequences necessary to operate the latching pistons 26, the base piston 28, the linear piston 43, and the vertical pistons 62. Reference numeral 56 refers generally to the pneumatic lines connected to the various pistons.

It is understood that the above described embodiment is merely illustrative of the application. Pneumatics could easily be replaced with hydraulics, electrical or magnetic systems. Switches and sensors may be of various types. The blade arrangements can be modified to increase the number cutting in the two adjacent trays, or to increase the number of trays in which dough is being simultaneously slit. Other embodiments, therefore, may be readily devised by those skilled in the art which will embody the principles of the invention and fall within the spirit and scope thereof.

I claim:

1. An automatic slider for slitting the tops of oblong-shaped sections of dough, representing rolls and bread loaves, carried in long trays, the longitudinal axis of which correspond to the longitudinal axis of the dough, in a traveling conveyor tray apparatus, with sides and drive chains, in which the trays are longitudinally positioned in a horizontal plane perpendicular to the direction of the tray movement in that plane preliminary to introducing the dough into an oven, the automatic slicer comprising:
   a plurality of vertical support members for holding the automatic slicer alongside and over the traveling conveyor tray apparatus;
   a plurality of rails mounted on platforms attached to the sides of the traveling conveyor tray apparatus;
   a plurality of slicer bases, upon which the vertical support members are mounted and attached, slideably engaged to the rails on each side of the traveling conveyor tray apparatus;
   a plurality of latching gears hinged to the slicer bases on the sides closest to the trays in the traveling conveyor tray apparatus;
   means for engaging and disengaging the latching gears with the traveling conveyor tray apparatus drive chains;
   a means for returning the slicer bases to a base position;
   horizontal support means connected at right angles to the vertical support members and positioned over the traveling conveyor tray apparatus;
   a shuttle suspended from the horizontal support means; and
   a plurality of blade assemblies mounted on the underside of the shuttle.

2. An automatic slicer as recited in claim 1 wherein the horizontal support means connected at right angles to the vertical support members and positioned over the traveling conveyor tray apparatus comprises:
   a horizontal shaft connected to the upper portions of the vertical support members on either side of the traveling conveyor tray apparatus so that it spans said apparatus and is aligned generally parallel to the longitudinal axis of the trays in said apparatus;
   a crossbeam suspended from the horizontal shaft;
   a plurality of plates perpendicularly connected to each end of the crossbeam and slideably connected to the vertical support members; and
   a plurality of rails attached to each side of the crossbeam and running the length of the crossbeam.

3. An automatic slicer as recited in claim 2 wherein the shuttle suspended from the horizontal support means comprises:
   a linear piston attached to the underside of the crossbeam;
   a linear, u-shaped member interconnected to the linear piston;
   a plurality of support brackets attached to the sides of the said member; and
   a plurality of linear bearings slideably attaching the support brackets to the rails attached to the crossbeam.

4. An automatic slicer as recited in claim 3 wherein each blade assembly mounted on the underside of the shuttle comprises:
   a plurality of vertical pins downwardly attached to the underside of the shuttle;
   a mounting plate slideably connected to the guide pins;
   a motor attached to the mounting plate;
   a plurality of vertical slicing blades connected to the motor and positioned so that each blade lies in a plane over the midpoint of a traveling conveyor tray in a vertical plane along the longitudinal axis of the corresponding tray; and
   a vertical piston interconnecting the underside of the shuttle to the mounting plate.

5. An automatic slicer as recited in claim 4 wherein: the slicing blades are seriated.

6. An automatic slicer as recited in claim 5 wherein: the means for engaging and disengaging the latching gears with the traveling conveyor tray apparatus drive chains are pneumatic pistons attached to the slicer base and connected to the latching gear.

7. An automatic slicer as recited in claim 6 wherein: the means for returning the slicer bases to a base position are pneumatic pistons.

8. An automatic slicer as recited in claim 7 further comprising:
   a plurality of rectangular blocks attached to and connecting each of the vertical support members grouped on a slicer base;
   a plurality of horizontal platforms mounted on the uppermost surfaces of said blocks;

a plurality of vertical stationary worms mounted on the top surface of each of the said platforms;

a plurality of locking collars interconnecting the uppermost portion of each worm to a vertical support member;

a plurality of worm wheels, each of which is geered with the thread of a worm, and to which the horizontal shaft is journaled; and a means for operating the worm wheels.

9. An automatic slicer as recited in claim 8 wherein the means for operating the worm wheels comprises:

a camshaft connected to one of the worm wheels;

a cam connected to the camshaft; and a motor connected to the camshaft by means of a drive chain.

* * * * *